United States Patent
Huang et al.

(10) Patent No.: US 11,580,136 B2
(45) Date of Patent: Feb. 14, 2023

(54) METHOD AND APPARATUS OF USER CLUSTERING, COMPUTER DEVICE AND MEDIUM

(71) Applicant: Beijing Baidu Netcom Science Technology Co., Ltd., Beijing (CN)

(72) Inventors: Feiqiao Huang, Beijing (CN); Jianghong Lin, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 98 days.

(21) Appl. No.: 17/197,116

(22) Filed: Mar. 10, 2021

(65) Prior Publication Data

US 2021/0191958 A1 Jun. 24, 2021

(30) Foreign Application Priority Data

Jun. 30, 2020 (CN) .......................... 202010616220.2

(51) Int. Cl.
*G06F 16/28* (2019.01)
*G06F 16/2457* (2019.01)
*G06F 16/22* (2019.01)

(52) U.S. Cl.
CPC ........ *G06F 16/285* (2019.01); *G06F 16/2282* (2019.01); *G06F 16/24573* (2019.01)

(58) Field of Classification Search
CPC .... G06F 21/50; G06F 21/552; G06F 16/9535; G06F 16/285; G06F 16/24573; G06F 16/2282

(Continued)

(56) References Cited

U.S. PATENT DOCUMENTS 10,735,445 B2 * 8/2020 Hodjat ................ H04L 63/1425
2002/0087540 A1 7/2002 Ashida et al.
(Continued)

FOREIGN PATENT DOCUMENTS

| JP | 2002-189597 A | 7/2002 |
| JP | 2013-131170 A | 7/2013 |
| JP | 2018-180104 A | 11/2018 |

OTHER PUBLICATIONS

Official Communication issued in corresponding European Patent Application No. 21162377.2, dated Oct. 6, 2021.

(Continued)

*Primary Examiner* — Hung T Vy
(74) *Attorney, Agent, or Firm* — Keating & Bennett, LLP (57) ABSTRACT

The present disclosure provides a method of user clustering, and the method includes: acquiring a clustering condition for a predetermined user group, wherein the clustering condition includes a time selecting condition and an event selecting condition; determining at least one target time period for each user behavior data in a user behavior database based on the time selecting condition; determining association data indicating a relationship between the each user behavior data and each target time period based on the each user behavior data and the each target time period; and selecting target association data for a time period to be monitored based on the time period to be monitored and the event selecting condition, so as to determine a target user belonging to the predetermined user group according to the target association data. The present disclosure also provides an apparatus of user clustering, a computer device and a non-transitory medium.

10 Claims, 5 Drawing Sheets

(58) Field of Classification Search
USPC .......................................................... 707/737
See application file for complete search history.

(56) References Cited

U.S. PATENT DOCUMENTS

| | | | |
|---|---|---|---|
| 2011/0081634 A1* | 4/2011 | Kurata | H04L 67/306 |
| | | | 434/236 |
| 2014/0279736 A1* | 9/2014 | Glass | H04N 21/44213 |
| | | | 706/12 |
| 2015/0051948 A1 | 2/2015 | Aizono et al. | |
| 2018/0288063 A1* | 10/2018 | Koottayi | H04L 63/1416 |

OTHER PUBLICATIONS

Rho et al., "Internet Customer Segmentation Using Web Log Data", Journal of Business & Economics Research, vol. 2 No 11, Nov. 2004, pp. 59-74.

\* cited by examiner

METHOD AND APPARATUS OF USER CLUSTERING, COMPUTER DEVICE AND MEDIUM

CROSS REFERENCE TO RELATED APPLICATIONS

This application claims priority to the Chinese Patent Application No. 202010616220.2 filed on Jun. 30, 2020, which is incorporated herein by reference in its entirety.

TECHNICAL FIELD

The present disclosure relates to a field of artificial intelligence, in particular to a data mining technology in a field of big data, and more particularly, the present disclosure provides a method of user clustering, an apparatus of user clustering, a computer device and a non-transitory medium.

BACKGROUND

User clustering refers to a process of selecting users according to needs of business scenarios, and selecting target user groups that meet predetermined clustering conditions. Results of user clustering may be used in an analysis process of website or application about user behaviors of user groups. Generally, users may be clustered according to user data, and the user data may include user attribute data and user behavior data. In a scheme of user clustering based on the user behavior data, related art needs to routine a query and storage logic for a user behavior database once for each predetermined time period, which results in occupying a large amount of computing resources and storage space, and has a poor flexibility.

SUMMARY

In view of this, the present disclosure provides a method of user clustering, an apparatus of user clustering, a computer device and a non-transitory medium.

An aspect of the present disclosure provides a method of user clustering, comprising: acquiring a clustering condition for a predetermined user group, wherein the clustering condition comprises a time selecting condition and an event selecting condition; determining, based on the time selecting condition, at least one target time period for each user behavior data in a user behavior database; determining association data indicating a relationship between the each user behavior data and each target time period of the at least one target time period based on the each user behavior data and each target time period, so as to generate an association table by the association data; and selecting, from the association table, target association data for a time period to be monitored based on the time period to be monitored and the event selecting condition, so as to determine a target user belonging to the predetermined user group according to the target association data.

Another aspect of the present disclosure provides an apparatus of user clustering, comprising: an acquisition module, a first determination module, a second determination module, and a clustering module. The acquisition module is configured to acquire a clustering condition for a predetermined user group, wherein the clustering condition comprises a time selecting condition and an event selecting condition. The first determination module is configured to determine, based on the time selecting condition, at least one target time period for each user behavior data in a user behavior database. The second determination module is configured to determine association data indicating a relationship between the each user behavior data and each target time period of the at least one target time period based on the each user behavior data and the each target time period, so as to generate an association table by the association data. The clustering module is configured to select, from the association table, target association data for a time period to be monitored based on the time period to be monitored and the event selecting condition, so as to determine a target user belonging to the predetermined user group according to the target association data Another aspect of the present disclosure provides a computer device, comprising: a memory, a processor; and computer programs stored on the memory and capable of executing on the processor. The processor implements the method described above when the program is executed.

Another aspect of the present disclosure provides a non-transitory computer-readable storage medium storing computer-executable instructions, which are configured to implement the method described above when executed.

Another aspect of the present disclosure provides a computer program, which includes computer-executable instructions, which are configured to implement the method described above when executed.

BRIEF DESCRIPTION OF THE DRAWINGS

Through the following description of the embodiments of the present disclosure with reference to the accompanying drawings, the above and other objectives, features, and advantages of the present disclosure may become clearer, in which.

DETAILED DESCRIPTION

Next, an embodiment of the present disclosure will be described with reference to the accompanying drawings. However, it should be understood that these descriptions are only illustrative and are not intended to limit the scope of the present disclosure. In the following detailed description, many specific details are set forth for ease of explanation to provide a comprehensive understanding of the embodiments of the present disclosure. However, it is obvious that one or more embodiments may also be implemented without these specific details. In addition, in the following description, the description of well-known structures and techniques is omitted to avoid unnecessarily confusing the concepts of the present disclosure.

The terms used herein are for a purpose of describing specific embodiments only and are not intended to limit the present disclosure. The terms "including", "comprising" and the like as used herein indicate the presence of said features, steps, operations, and/or components, but do not exclude the presence or addition of one or more other features, steps, operations, or components.

All terms used herein, including technical and scientific terms, have meanings generally understood by those skilled in the art, unless otherwise defined. It should be noted that the terms used herein should be interpreted as having meanings consistent with the context of this specification and should not be interpreted in an idealized or overly rigid manner.

In a case of using an expression similar to "at least one of A, B and C, etc.", generally speaking, it should be interpreted according to the meaning of the expression commonly understood by those skilled in the art (for example, "a system having at least one of A, B and C" shall be, but not limited to, a system having A alone, a system having B alone, a system having C alone, a system having A and B, a system having A and C, a system having B and C, and/or a system having A, B, C, etc.).

The embodiments of the present disclosure provide a method and an apparatus of user clustering, and a computer device and a non-transitory medium. The method of user clustering may include an acquisition process, a first determination process, a second determination process, and a clustering process. In the acquisition process, a clustering condition for a predetermined user group is acquired, and the clustering condition may include: a time selecting condition and an event selecting condition. The first determination process is performed to determine at least one target time period for each user behavior data in a user behavior database based on the time selecting condition. The second determination process is performed. In the second determination process for each user behavior data, the association data indicating a relationship between the user behavior data and each target time period of the at least one target time period is determined based on the user behavior data and the each target time period for the user behavior data, so as to generate an association table by the association data. Then, the clustering process is performed, so that target association data for a time period to be monitored is selected from the association table based on the time period to be monitored and the event selecting condition, so as to determine a target user belonging to a predetermined user group according to the target association data.

The user clustering refers to a process of selecting users according to needs of business scenarios, and selecting target user groups that meet predetermined clustering conditions. Results of the user clustering may be used in an analysis process of website or application about user behaviors of user groups. Generally, users may be clustered according to user data, and the user data may include user attribute data and user behavior data. As the user behavior data may reflect dynamic behavior features of the users, a scheme of user clustering based on the user behavior data may obtain better real-time and higher accuracy user clustering results.

Figure 1:
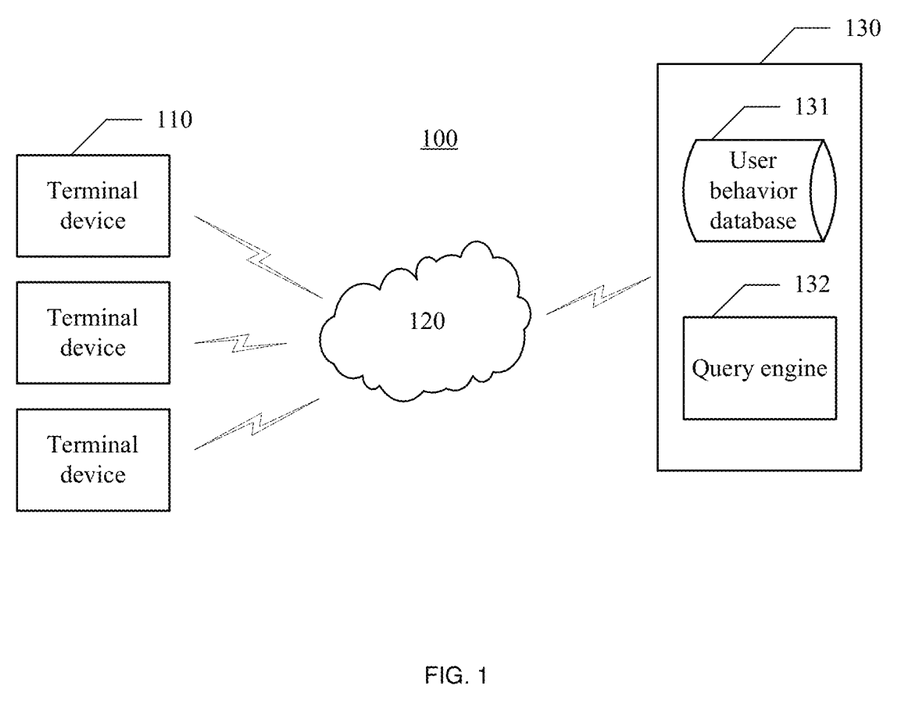
FIG. 1 schematically illustrates an exemplary system architecture for implementing a method and an apparatus of user clustering according to an embodiment of the present disclosure.

FIG. 1 schematically illustrates an exemplary system architecture 100 for implementing a method and an apparatus of user clustering according to an embodiment of the present disclosure. It should be noted that, FIG. 1 only shows an example of the system architecture that may be applied to an embodiment of the present disclosure to help those skilled in the art understand the technical content of the present disclosure, but it does not mean that the embodiment of the present disclosure may not be used for other devices, systems, environments or scenarios.

As shown in FIG. 1, the system architecture 100 according to an embodiment may include a plurality of terminal devices 110, a network 120, and a server 130. The terminal devices 110 may be various terminal devices, such as a desktop, a portable computer, a smart phone, a tablet computer, etc., and there is no limitation here. The server 130 may be electronic device with certain computing power, such as a server, a server cluster, etc., and there is no limitation here.

In response to operation behaviors of the user on the terminal devices 110 (taking a e-commerce platform as an example, the operation behaviors include, for example, a login behavior, a page access behavior, a commodity browsing behavior, a commodity purchasing behavior, a commodity collecting behavior, etc.), the server 130 may store the user behavior data for the operation behaviors in a user behavior database 131 according to a granularity of a single behavior. The user behavior database 131 may be a relational database. In a case of a large amount of user behavior data, the user behavior database may adopt a large distributed data warehouse. Exemplarily, the user behavior database 131 may contain one or more user behavior data, and the user behavior data may contain user identification information, event description information, and first time information for indicating an occurrence time of an event (including, for example, an occurrence date and an occurrence time). For example, it may be shown in Table 1.

TABLE 1

| First time information | | User information | Event description |
|---|---|---|---|
| Occurrence date | Occurrence time | identification | information |
| 2019-01-01 | 11:10:01 | 10000 | Login |
| 2019-01-01 | 11:11:11 | 10000 | Purchasing commodity A |
| 2019-01-01 | 11:11:51 | 10001 | Login |
| 2019-01-01 | 11:20:10 | 10001 | Purchasing commodity B |
| . . . | . . . | . . . | . . . |
| 2019-01-02 | 15:10:10 | 10000 | Browsing page X |
| . . . | . . . | . . . | . . . |
| 2019-01-03 | 09:00:05 | 10001 | Purchasing commodity A |
| . . . | . . . | . . . | . . . |
| 2019-01-06 | 10:18:15 | 10000 | Browsing page X |
| 2019-01-06 | 10:16:15 | 10000 | Purchasing commodity A |
| . . . | . . . | . . . | . . . |

The server 130 may perform a user clustering operation on the user behavior database 131 by using a query engine 132, based on the user behavior data in the user behavior database 131, so as to determine one or more user groups.

In a processing mode, when performing the user clustering, from a perspective of each predetermined time period within an observation window, for each predetermined time period, a traversal query is performed on the user behavior database to search and store the user behavior data whose relationship with a time period to be monitored matching a clustering condition. The observation window indicates a time period concerned in a subsequent user behavior analysis based on clustering results after the clustering results are determined. The observation window may include one or more predetermined time periods, and the predetermined time period may be set according to actual needs, such as 1 day, 1 hour, 1 week, etc. The clustering condition contains feature information that a predetermined user group to be matched.

For example, 1 day is taken as a predetermined time period. The clustering condition is set to indicate that "a number of times of purchasing commodity A is greater than or equal to 2 in the past 3 days". The observation window is set from Jan. 10, 2019 to Jan. 12, 2019. According to this processing method, for a first predetermined time period of Jan. 10, 2019 within the observation window, it is necessary to take user identification information as an index to search, in the user behavior database, the user identification information that the event occurrence date is one of Jan. 7, 2019, Jan. 8, 2019, and Jan. 9, 2019, and the event description information matches the above "number of times of purchasing commodity A is greater than or equal to 2", and store the user identification information. And next, for a second predetermined time period of Jan. 11, 2019 within the observation window, it is necessary to take user identification information as an index to search, in the user behavior database, the user identification information that the event occurrence date is one of Jan. 8, 2019, Jan. 9, 2019, and Jan. 10, 2019, and the event description information matches the above "number of times of purchasing commodity A is greater than or equal to 2" and store the user identification information. And next, for a third predetermined time period of Jan. 12, 2019 within the observation window, it is necessary to take user identification information as an index to search, in the user behavior database, the user identification information that the event occurrence date is one of Jan. 9, 2019, Jan. 10, 2019, and Jan. 11, 2019, and the event description information matches the above "number of times of purchasing commodity A is greater than or equal to 2", and store the user identification information.

Because the above processing manner needs to routine a query and storage logic for a user behavior database once for each predetermined time period, a large amount of computing resources and storage space may be occupied, and a poor flexibility may be achieved.

According to an embodiment of the present disclosure, a method of user clustering is provided. This method is illustrated by illustration. It should be noted that, a serial number of each operation in the following method is only used as an indication of the operation for description, and should not be regarded as indicating an execution order of each operation. Unless explicitly indicated, the method does not need to be executed exactly in an order shown.

Figure 2:
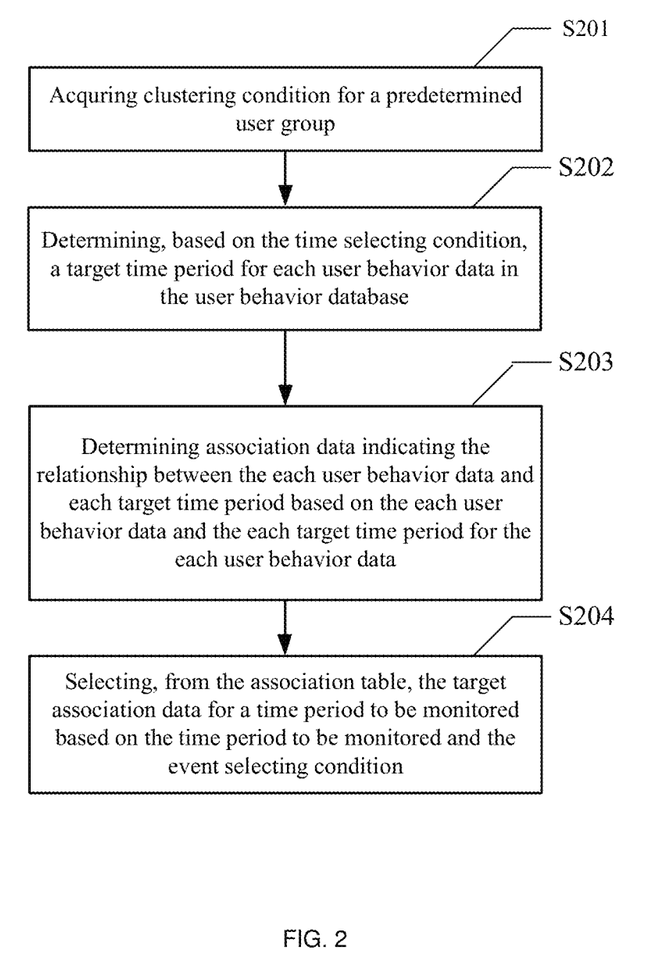
FIG. 2 schematically shows a flow chart of a method of user clustering according to an embodiment of the present disclosure.

FIG. 2 schematically shows a flow chart of a method of user clustering according to an embodiment of the present disclosure, which may be executed on a server side as shown in FIG. 1, for example.

As shown in FIG. 2, the method may include operation S201 to operation S204.

In operation S201, a clustering condition for a predetermined user group is acquired.

Exemplarily, the clustering condition for the predetermined user group is used to indicate feature information that the predetermined user group needs to match. The user clustering is performed based on the clustering condition, and the obtained target users belong to the predetermined user group. The clustering condition may include: a time selecting condition and an event selecting condition. For example, when the clustering condition being "the number of times of purchasing commodity A is greater than or equal to 2 in the past 3 days", the time selecting condition in the clustering condition indicates that: in first 3 days, and the event selecting condition in the clustering condition indicates that: the number of times of purchasing commodity A is greater than or equal to 2. The time selecting condition is used to indicate a relationship between an occurrence time of a concerned event and a time period to be monitored, and the event selecting condition is used to describe specific information of the concerned event. According to actual needs, the time selecting condition and the event selecting condition may be set respectively, so as to generate corresponding clustering conditions. The time selecting condition and the event selecting condition may be expressed in various data forms, such as in a form of key-value pairs.

For example, the server may communicate with a background terminal, and the background terminal may provide a condition configuration interface, and the condition configuration interface may include a condition configuration entry. A background user may configure a clustering condition through the condition configuration entry and trigger a condition configuration instruction. The background terminal determines a clustering condition based on the condition configuration instruction and transmits the clustering condition to a server, so that the server acquires the clustering condition of the predetermined user group.

In operation S202, at least one target time period for each user behavior data in the user behavior database is determined based on the time selecting condition.

Exemplarily, as shown in Table 1 above, each user behavior data in the user behavior database is used to indicate information related to a user operation behavior. According to an embodiment of the present disclosure, from a perspective of each user behavior data, at least one target time period for each user behavior data is determined based on the time selecting condition.

For example, for the user behavior data D, in the operation S202, an occurrence time of an event of the user behavior data D is taken as the occurrence time of the concerned event, and all possible time periods to be monitored are calculated from the occurrence time of the event, so as to be indicated as at least one target time period for the user behavior data D, according to a relationship between the occurrence time of the concerned event and the time period to be monitored indicated by the time selecting condition. For example, target time periods of the user behavior data D includes $T_1$, $T_2$, and $T_3$, which means that at least one of $T_1$, $T_2$, and $T_3$ should be taken as the time period to be monitored for the user clustering, the user behavior data D needs to be paid attention to. However, it is not necessary to pay attention to the user behavior data D when other time except $T_1$, $T_2$, and $T_3$ is used as the time period to be monitored for user clustering. A process of determining a target time period for each other user behavior data in the user behavior database is the same, which will not be repeated here.

In operation S203, the association data indicating the relationship between each user behavior data and each target time period of the at least one target time period is determined based on the each user behavior data and the each target time period for the each user behavior data, so as to generate an association table by the association data.

Following the example above, for the user behavior data D, association data (D, $T_1$) indicating the relationship between the user behavior data D and the target time period $T_1$ may be determined based on the user behavior data D and the target time period $T_1$. In the same way, it is also possible to determine association data (D, $T_2$) indicating the relationship between the user behavior data D and the target time period $T_2$, and association data (D, $T_3$) indicating the relationship between the user behavior data D and the target time period $T_3$. A process of determining one or more association data for each other user behavior data is the same. Taking each association data as granularity, an association table may be formed by association data for the each user behavior data. Exemplarily, after determining the association data, if the association table is not generated, the association table is first generated and the association data is added to the association table, and if the association table exists, the association data is directly added to the association table.

In operation S204, target association data for the time period to be monitored is selected from the association table based on the time period to be monitored and the event selecting condition, so as to determine a target user belonging to the predetermined user group according to the target association data.

According to an embodiment of the present disclosure, when performing the user clustering by using a same clustering condition, due to variable characteristics of the user behavior data, the times to be monitored are different, the clustering results are different. The operation S204 may select, from the association table, target association data containing a target time period within the time period to be monitored and the event description information matching the event selecting condition, and indicate the association data as the target association data. Exemplarily, a target user belonging to a predetermined user group for the time period to be monitored may be determined according to a user identification of the target association data.

It may be understood by those skilled in the art that, in a method of user clustering according to an embodiment of the present disclosure, after each user behavior data is generated, all possible target time periods corresponding to the each user behavior data are calculated from the each user behavior data according to the time selecting condition in the clustering condition. An association table is constructed according to a relationship between the each user behavior data and the target time period. Each association data in the association table is used to indicate that a relationship between user behavior data and a target time period for the user behavior data matches the time selecting condition described above, so that the association table may cover all the existing association data that match the time selecting condition described above. And a target user of the predetermined user group is determined based on the target association data in the association table that matches the time period to be monitored and the event selecting condition. The above process may be executed every time a new user behavior data is generated. Compared with the related art, from a perspective of the target time period, a whole transverse query and storage scheme of the user behavior database for each predetermined time period may effectively save computing resources and storage space.

Figure 3:
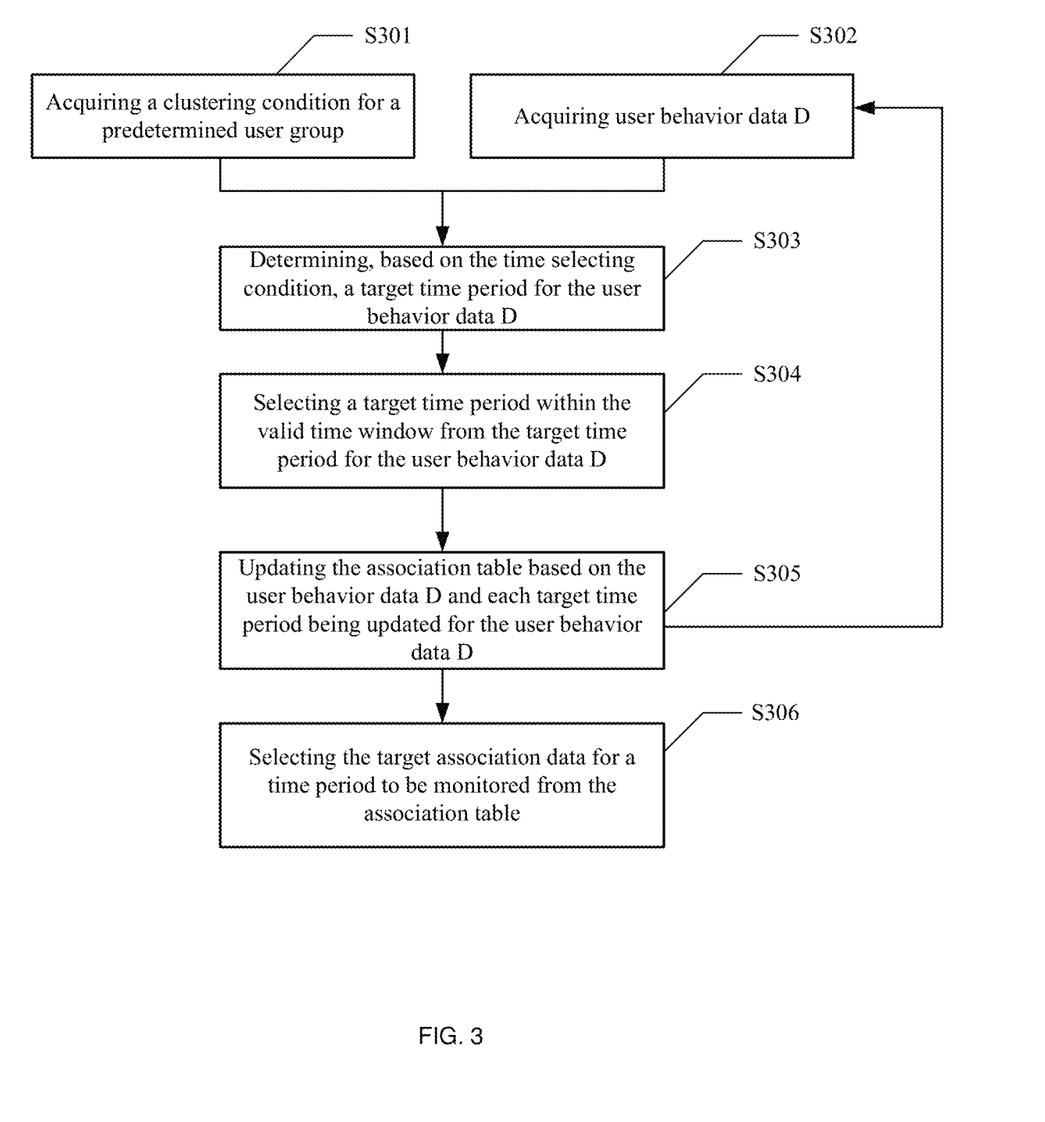
FIG. 3 schematically shows an exemplary flow chart of a method of user clustering according to another embodiment of the present disclosure.

Referring to FIG. 3, a method of user clustering according to an embodiment of the present disclosure may be illustrated as an example.

FIG. 3 schematically shows an example flow chart of a method of user clustering according to another embodiment of the present disclosure, which may be executed, for example, on the server side as shown in FIG. 1.

As shown in FIG. 3, the method may include operations S301 to S306.

In operation S301, a clustering condition for a predetermined user group is acquired. As described above, the clustering condition may include a time selecting condition and an event selecting condition. When the clustering condition does not change, the operation S301 may be executed only once. When the clustering condition changes, the operation S301 is executed once.

In operation S302, user behavior data D is acquired. Exemplarily, the operation S302 may acquire user behavior data from a terminal device, or generate user behavior data according to information uploaded by the terminal devices. After acquiring the user behavior data, on the one hand, the user behavior data is stored in a user behavior database, and on the other hand, the operation S303 is executed. This embodiment takes the user behavior data D as an example, and the following operations may be performed for each other user behavior data.

In operation S303, at least one target time period for the user behavior data D is determined according to the time selecting condition.

For example, the user behavior data D may be as shown in Table 2. The user behavior data D may include first time information for indicating an occurrence time of an event, including, for example, an occurrence date and an occurrence time. In this example, the occurrence time of the event of the user behavior data D indicated by the first time information is 11:11:11 on Jan. 8, 2019.

TABLE 2

| First time information | | User identification | Event description |
|---|---|---|---|
| Occurrence date | Occurrence time | information | information |
| 2019-01-08 | 11:11:11 | 10001 | Purchasing commodity A |

In an embodiment of the present disclosure, the time selecting condition is related to a first number of previous predetermined time periods. In this case, a process of determining at least one target time period for the user behavior data D in the operation S303 described above may include: indicating each of the first number of predetermined time periods immediately subsequent to the event occurrence time of the user behavior data D, as a target time period.

Figure 4:
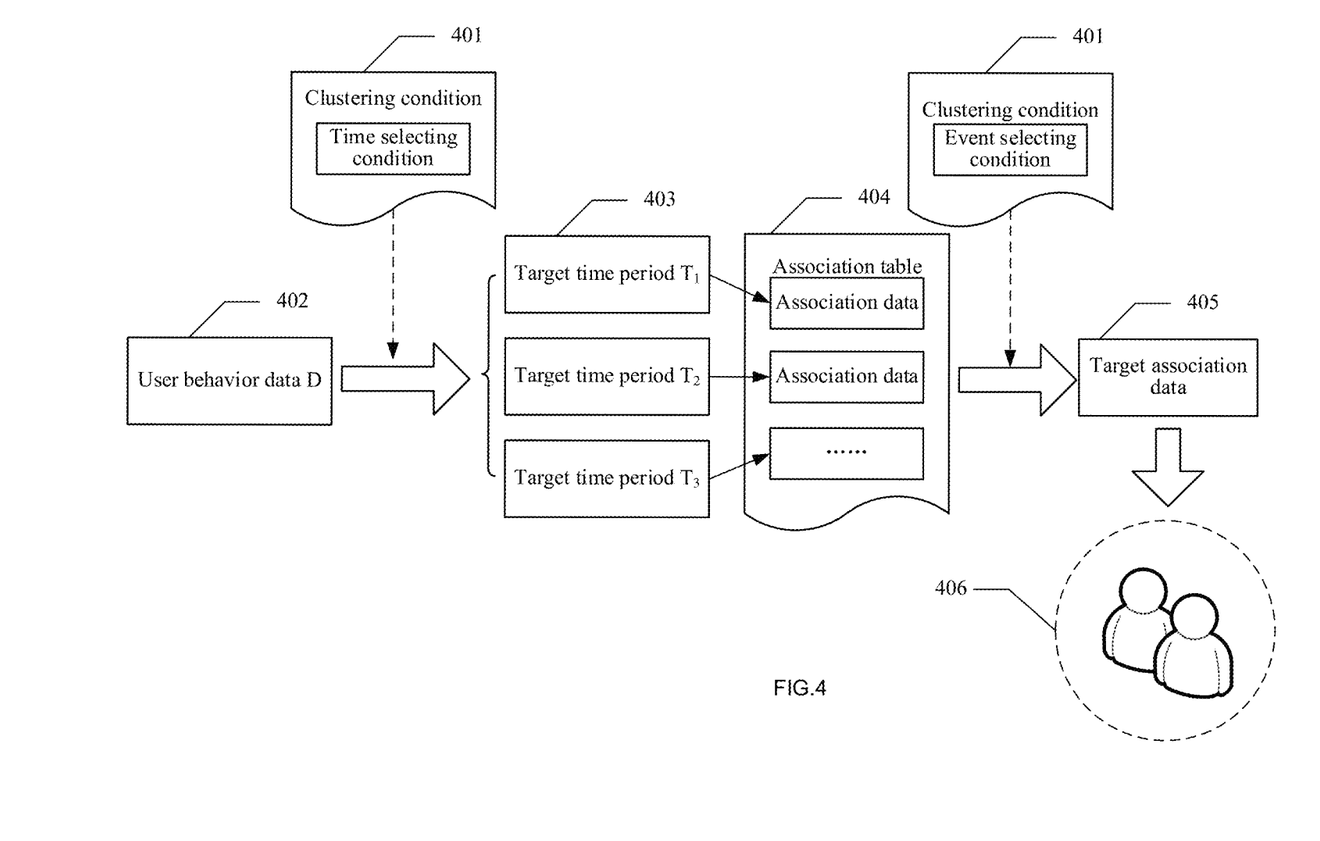
FIG. 4 schematically shows an exemplary diagram of a method of user clustering according to an embodiment of the present disclosure.

FIG. 4 schematically shows an example diagram of a process of user clustering according to an embodiment of the present disclosure. As shown in FIG. 4, for example, the time selecting condition in the clustering condition 401 is related to previous three predetermined time periods, which may be expressed as [−3, −1]. Taking 1 day as a predetermined time period, three predetermined time periods immediately subsequent to Jan. 8, 2019 may be determined: Jan. 9, 2019 (Jan. 8, 2019+1 day), Jan. 10, 2019 (Jan. 8, 2019+2 days), and Jan. 11, 2019 (Jan. 8, 2019+3 days), which are respectively the three target time periods 403 of user behavior data D 402, which may be expressed as $\{T_1, T_2, \text{and } T_3\}$. It shows that the user behavior data D 402 affects user clustering results of the three target time periods 403 under the time selecting condition. According to an embodiment of the present disclosure, time information may be expressed in a form of time stamp.

In another embodiment of the present disclosure, the time selecting condition is related to a second number of subsequent predetermined time periods. A process of determining at least one target time period for the user behavior data D in the operation S303 described above may include: indicating each of the second number of predetermined time periods immediately previous to the event occurrence time of the user behavior data D, as a target time period.

For example, the time selecting condition in the clustering condition is related to next two predetermined time periods, which may be expressed as [+1, +2]. Taking 1 day as a predetermined time period, two predetermined time periods immediately previous to Jan. 8, 2019 may be determined: Jan. 7, 2019 (Jan. 8, 2019−1 day) and Jan. 6, 2019 (Jan. 8, 2019−2 days), which are respectively the two target time periods of user behavior data D. It shows that the user behavior data D affects user clustering results of the two target time periods under this time selecting condition. It may be understood that the method of user clustering according to the embodiments of the present disclosure may be used not only in a case that the target time period is a future time period, but also in a case that the target time period is a past time period, and may be adjusted according to settings of clustering conditions, which has high flexibility.

In operation S304, a target time period within a valid time window is selected from the at least one target time period for the user behavior data D, and the selected target time period is indicated as updated at least one target time period.

In operation S305, the association table is updated based on the user behavior data D and each of the updated at least one target time period for the user behavior data D. The operations S302 to S305 described above are performed repeatedly, and the association table is updated constantly.

As an example, the valid time window may be an observation window described above. For example, the observation window is from Jan. 10, 2019 to Jan. 12, 2019, and target dates outside the observation window are meaningless. Therefore, after determining the three target time periods $\{T_1, T_2, T_3\}$ of user behavior data D (in which $T_1$=Jan. 9, 2019, $T_2$=Jan. 10, 2019, and $T_3$=Jan. 11, 2019), the target time period outside the observation window (i.e., Jan. 9, 2019) in the above three target time periods is selected to obtain the updated two target time periods: $\{T_2, T_3\}$.

As shown in FIG. 4, the user behavior data D 402 and the updated target time period $T_2$ 403 constitute an association data (D, $T_2$), and the user behavior data D 402 and the updated target time period $T_3$ 403 constitute an association data (D, $T_3$). The association table 404 may be updated based on the association data. For example, parts of the association table are shown in Table 3.

TABLE 3

| Association data No. | First time information | | User identification information | Event description information | Target time period |
|---|---|---|---|---|---|
| | Occurrence date | Occurrence time | | | |
| (D, $T_2$) | 2019 Jan. 8 | 11:11:11 | 10001 | Purchasing commodity A | 2019 Jan. 10 |
| (D, $T_3$) | 2019 Jan. 8 | 11:11:11 | 10001 | Purchasing commodity A | 2019 Jan. 11 |

According to table 3, the association data indicating the relationship between the user behavior data and the target time period includes: the user behavior data and second time information related to the target time period. According to tables 1 to 3, each user behavior data may also include: user identification information and event description information. It may be understood that in the process of updating the association table based on the each obtained user behavior data in the operations S302 to S305 described above, an amount of data calculation is small due to an execution of each user behavior data at a time. A calculation granularity is a single user behavior data, which makes the calculation more flexible. In addition, due to limitations of the time selecting condition and the valid time window, the obtained association data for the each user behavior data is limited, and the storage space is also small.

According to an embodiment of the present disclosure, the above process of determining association data indicating the relationship between the user behavior data D and the each target time period may include: performing a Cartesian product on the user behavior data D and at least one target time period $\{T_2, T_3\}$ for the user behavior data D, so as to obtain the association data $\{(D, T_2), (D, T_3)\}$ indicating the relationship between the user behavior data and the each target time period. This embodiment calculates the association data as an ordered pair based on the principle of the Cartesian product, so that the association data corresponding to each user behavior data may be determined quickly and without omission.

Referring to FIG. 3, in operation S306, target association data for a time period to be monitored is selected from the association table according to the time period to be monitored and the event selecting condition in the clustering condition, so as to determine a target user belonging to the predetermined user group according to the target association data.

According to an embodiment of the present disclosure, with continued reference to FIG. 4, a process of selecting target association data from the association table in the operation S306 described above may include: selecting, from the association table 404, target association data 405 containing a target time period within a time period to be monitored and event description information matches the event selecting condition. By grouping the target association data 405 according to the user identification information, target association data 1, target association data 2 . . . target association data n are obtained, n is an integer greater than 2. The target user belonging to the predetermined user group 406 is determined according to the user identification information of the target association data 405 of each group.

According to an embodiment of the present disclosure, the above process of selecting, from the association table, target association data containing a target time period within a time period to be monitored and event description information matches the event selecting condition may include: aggregating the association data with the same user identification information and the same second time information in the association table with the user identification information and the second time information as indexes. If the second time information and event description information of the aggregated association data match the time period to be monitored and the event selecting condition, respectively, association data is determined as target association data, and a target user belonging to the predetermined user group is determined according to the user identification information of the association data.

For example, the event selecting condition is used to indicate that: a number of occurrence times of a predetermined behavior for a predetermined commodity is greater than or equal to a predetermined value. In this case, a counting parameter M is preset and reset to an initial value M=0. Association data with the user identification information equal to the first value and the second time information equal to the second value is searched in the association table. For the searched each association data from the association table, when it is determined that the event description information in the association data indicates the predetermined behavior for the predetermined commodity, a value of the counting parameter M is incremented by 1. When the searching for the association table is completed, the value of M indicates an aggregation result of the event description information of the searched association data. At this time, it is determined whether a value of the counting parameter M is greater than or equal to a predetermined value or not. If a value of the counting parameter M is greater than or equal to a predetermined value, the association data is determined as the target association data.

In an example, the predetermined commodity is commodity A, the predetermined behavior is a purchase behavior, and the predetermined value is 2. A first value is user identification information "10001" of the user behavior data D, and a second value is a time stamp indication value of the time period to be monitored. The time period to be monitored is set as Jan. 10, 2019. For the searched each association data from the association table, when it is determined that the event description information in the association data indicates a purchase behavior for the commodity A, the value of M is incremented by 1. When the searching for the association table is completed, determining whether the value of M is greater than or equal to 2 or not. If the value of M is greater than or equal to 2, it is determined that the searched association data are the target association data for the time period to be monitored of Jan. 10, 2019, that is, it is determined that the user indicated by the user identification information "10001" is the target user belonging to the predetermined user group. If the value of M is not greater than or equal to 2, it is determined that the searched association data are not the target association data for the time period to be monitored of Jan. 10, 2019. The first value may be replaced and the above process repeated until all values of the user identification information in the association table are traversed.

In another example, by setting the clustering condition, user groups that perform combined event operation behaviors may also be selected. The event selecting condition is used to indicate that: occurrence times of a first predetermined behavior for a first predetermined commodity are greater than or equal to a first predetermined value, and occurrence times of a second predetermined behavior for a second predetermined commodity are greater than or equal to a second predetermined value. For example, the first predetermined commodity is commodity A, the first predetermined behavior is a purchase behavior, and the first predetermined value is 3. The second predetermined commodity is commodity B, the second predetermined behavior is a purchase behavior, and the second predetermined value is 2. The above process of selecting, from the association table, target association data containing the target time period within the time period to be monitored and the event description information matches the event selecting condition, may include: presetting a first counting parameter M and a second counting parameter N. The first counting parameter M and the second counting parameter N are reset to an initial value 0, respectively. In the association table, association data in which user identification information is equal to a first value (for example, "10001") and second time information is equal to a second value (for example, Jan. 10, 2019) are searched. For the searched each association data, if it is determined that the event description information in the association data indicates the first predetermined behavior for the first predetermined commodity, the value of the first counting parameter M is incremented by 1. If it is determined that the event description information in the association data indicates the second predetermined behavior for the second predetermined commodity, the value of the second counting parameter N is incremented by 1. When the searching for the association table is completed, determining whether the value of the first counting parameter M is greater than or equal to 3 or not, and whether the value of the second counting parameter N is greater than or equal to 2 or not. If M≥3 and N≥2 are met, it is determined that all the searched association data are the target association data for the time period to be monitored of Jan. 10, 2019, that is, the user indicated by the user identification information "10001" is the target user belonging to the predetermined user group. If not, it is determined that all the searched association data are not the target association data for the time period to be monitored of Jan. 10, 2019. The first value may be replaced and the above process repeated until all the values of the user identification information in the association table are traversed. It may be understood that when the clustering condition includes a plurality of event selecting conditions, the construction process of the previous association table may not be affected, and the storage space may not be incremented.

According to an embodiment of the present disclosure, in a case that a plurality of sub-clustering conditions are included in the clustering condition of the predetermined user group, a plurality of association tables for the plurality of sub-clustering conditions may be constructed, respectively, based on the above embodiments, and a target user set that each of the plurality of association tables matches to the sub-clustering condition may be determined. An intersection of a plurality of the target user sets is determined as target users belonging to the predetermined user group.

Figure 5:
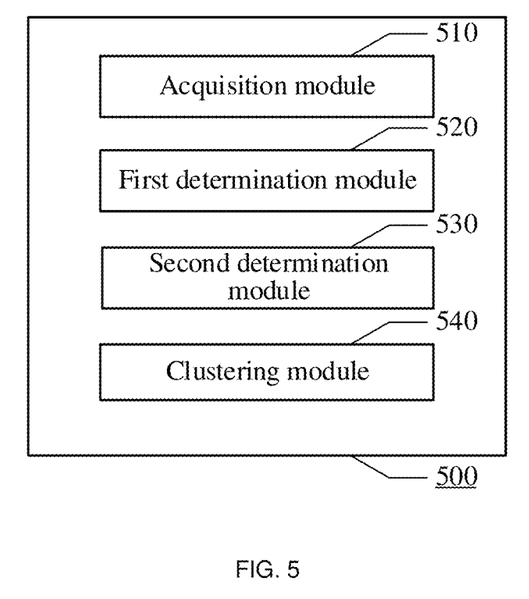
FIG. 5 schematically shows a block diagram of an apparatus of user clustering according to an embodiment of the present disclosure.

FIG. 5 schematically shows a block diagram of an apparatus of user clustering according to an embodiment of the present disclosure.

As shown in FIG. 5, the apparatus 500 of user clustering may include: an acquisition module 510, a first determination module 520, a second determination module 530, and a clustering module 540.

The acquisition module 510 is used to acquire a clustering condition for a predetermined user group, and the clustering condition comprises a time selecting condition and an event selecting condition.

The first determination module 520 is used to determine, based on the time selecting condition, at least one target time period for each user behavior data in a user behavior database.

The second determination module 530 is used to determine association data indicating the relationship between the each user behavior data and the each target time period based on the each user behavior data and each target time period of the at least one target time period for the each user behavior data, so as to generate an association table by the association data.

The clustering module 540 is used to select, from the association table, target association data for a time period to be monitored based on the time period to be monitored and the event selecting condition, so as to determine a target user belonging to the predetermined user group according to the target association data.

It should be noted that, the implementation mode, solved technical problems, realized functions and achieved technical effects of each module/unit/sub-unit in the embodiment of the device part are respectively the same as or similar to the implementation mode, solved technical problems, realized functions and achieved technical effects of each corresponding step in the embodiment of the method part, which will not be repeated here.

Any number of the modules, sub-modules, units and sub-units according to the embodiments of the present disclosure, or at least part of the functions of any number of them may be implemented in a single one module. Any one or more of the modules, sub-modules, units and sub-units according to the embodiments of the present disclosure may be split into multiple modules for implementation. Any one or more of the modules, sub-modules, units and sub-units according to the embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub-modules, units and sub-units according to the embodiments of the present disclosure may be at least partially implemented as a computer program module that, and when executed, perform the corresponding functions.

For example, any number of the acquisition module 510, the first determination module 520, the second determination module 530, and the clustering module 540 may be implemented in one module or any one of them may be split into multiple modules. Alternatively, at least part of the functions of one or more of these modules may be combined with at least part of the functions of other modules and implemented in one module. According to an embodiment of the present disclosure, at least one of the acquisition module 510, the first determination module 520, the second determination module 530, and the clustering module 540 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the acquisition module 510, the first determination module 520, the second determination module 530 and the clustering module 540 may be at least partially implemented as a computer program module, and when executed, perform the corresponding functions.

Figure 6:
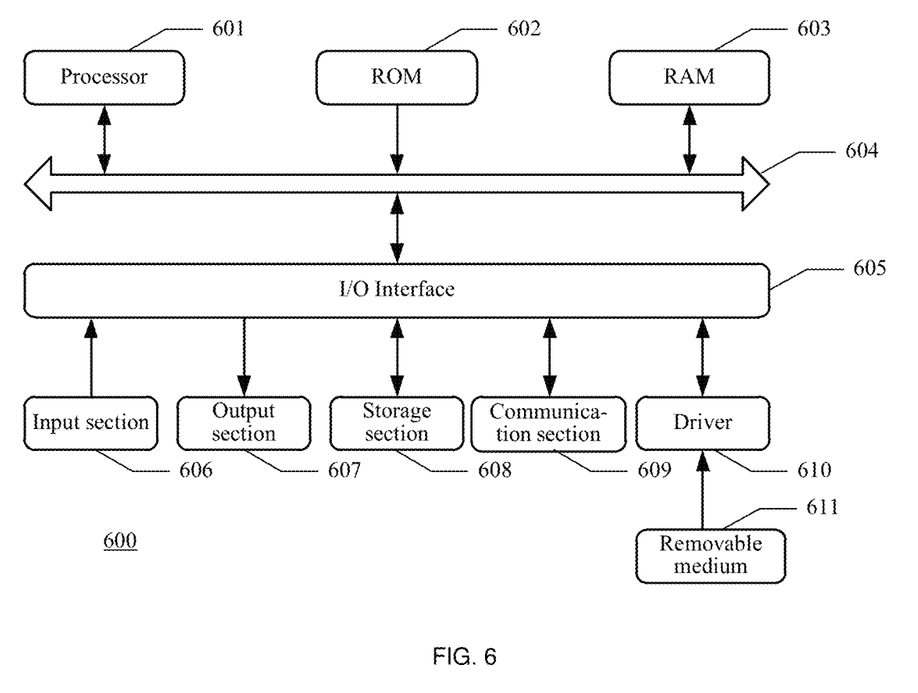
FIG. 6 schematically shows a block diagram of a computer device according to an embodiment of the present disclosure.

FIG. 6 schematically shows a block diagram of a computer device adapted to implement the method described above, according to an embodiment of the present disclosure. The computer device shown in FIG. 6 is only an example and should not bring any limitation on the function and use scope of the embodiments of the present disclosure.

As shown in FIG. 6, a computer device 600 according to an embodiment of the present disclosure includes a processor 601, which may execute various appropriate actions and processing according to the program stored in a read only memory (ROM) 602 or the program loaded into a random access memory (RAM) 603 from a storage section 608. The processor 601 may, for example, include a general-purpose microprocessor (for example, CPU), an instruction set processor and/or a related chipset and/or a special-purpose microprocessor (for example, an application specific integrated circuit (ASIC)), and the like. The processor 601 may also include an on-board memory for caching purposes. The processor 601 may include a single processing unit or multiple processing units for executing different actions of the method flow according to the embodiments of the present disclosure.

In the RAM 603, various programs and data required for the operation of the device 600 are stored. The processor 601, the ROM 602 and the RAM 603 are connected to each other through a bus 604. The processor 601 executes various operations of the method flow according to the embodiments of the present disclosure by executing the programs in the ROM 602 and/or the RAM 603. It should be noted that the program may also be stored in one or more memories other than the ROM 602 and the RAM 603. The processor 601 may also execute various operations of the method flow according to the embodiments of the present disclosure by executing the programs stored in the one or more memories.

According to an embodiment of the present disclosure, the device 600 may further include an input/output (I/O) interface 605 which is also connected to the bus 604. The device 600 may further include one or more of the following components connected to the I/O interface 605: an input section 606 including a keyboard, a mouse, etc.; an output section 607 including a cathode ray tube (CRT), a liquid crystal display (LCD), etc. and a speaker, etc.; a storage section 608 including a hard disk, etc.; and a communication section 609 including a network interface card such as a LAN card, a modem, and the like. The communication section 609 performs communication processing via a network such as the Internet. A driver 610 is also connected to the I/O interface 605 as required. A removable medium 611, such as a magnetic disk, an optical disk, a magneto-optical disk, a semiconductor memory, and the like, is installed on the driver 610 as required, so that the computer program read therefrom is installed into the storage section 608 as needed.

The method flow according to the embodiments of the present disclosure may be implemented as a computer software program. For example, the embodiments of the present disclosure include a computer program product including a computer program carried on a non-transitory computer-readable storage medium. The computer program includes a program code for execution of the method shown in the flowchart. In such an embodiment, the computer program may be downloaded and installed from the network through the communication section 609, and/or installed from the removable medium 611. When the computer program is executed by the processor 601, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the above-mentioned ROM 602 and/or RAM 603 and/or one or more memories other than the ROM 602 and RAM 603.

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art can make various substitutions and modifications, and these substitutions and modifications should all fall within the scope of the present disclosure.

The invention claimed is:

1. A method of user clustering, comprising:
   acquiring a clustering condition for a predetermined user group, wherein the clustering condition comprises a time selecting condition and an event selecting condition;
   determining, based on the time selecting condition, at least one target time period for each user behavior data in a user behavior database;
   determining association data indicating a relationship between the each user behavior data and each target time period of the at least one target time period based on the each user behavior data and the each target time period, so as to generate an association table by the association data; and
   selecting, from the association table, target association data for a time period to be monitored based on the time period to be monitored and the event selecting condition, so as to determine a target user belonging to the predetermined user group according to the target association data, wherein
   the association data contains: the each user behavior data and second time information related to the each target time period;
   the each user behavior data contains: user identification information and event description information;
   the selecting, from the association table, target association data for a time period to be monitored comprises selecting, from the association table, target association data containing a target time period within the time period to be monitored and the event description information matching the event selecting condition;
   the event selecting condition comprises occurrence times of a predetermined behavior for a predetermined commodity being greater than or equal to a predetermined value; and
   the selecting, from the association table, target association data containing a target time period within the time period to be monitored and the event description information matching the event selecting condition, comprises:
   resetting a counting parameter to an initial value of 0;
   searching, in the association table, association data containing the user identification information being equal to a first value and the second time information being equal to a second value;
   incrementing a value of the counting parameter by 1 in response to determining that the event description information of each association data searched indicates the predetermined behavior for the predetermined commodity;
   determining whether the value of the counting parameter is greater than or equal to the predetermined value or not when the searching being completed; and
   determining the each association data as the target association data in response to the value of the counting parameter being greater than or equal to the predetermined value.

2. The method according to claim 1, wherein the time selecting condition is related to a first number of previous predetermined time periods, and the each user behavior data contains first time information indicating an event occurrence time; and
   wherein the determining at least one target time period for each user behavior data in a user behavior database comprises: indicating each of the first number of predetermined time periods immediately subsequent to the event occurrence time of the each user behavior data, as a target time period.

3. The method according to claim 1, wherein the time selecting condition is related to a second number of subsequent predetermined time periods, and the each user behavior data contains first time information indicating an event occurrence time; and
   wherein the determining at least one target time period for each user behavior data in a user behavior database comprises: indicating each of the second number of predetermined time periods immediately previous to the event occurrence time of the each user behavior data, as a target time period.

4. The method according to claim 1, further comprising, subsequent to the determining the at least one target time period:
selecting, from the at least one target time period, a target time period within a valid time window; and
indicating the selected target time period as the at least one target time period being updated.

5. The method according to claim 1, wherein the determining the association data indicating a relationship between the each user behavior data and each target time period of the at least one target time period, comprises:
performing a Cartesian product on the each user behavior data and the at least one target time period for the each user behavior data, so as to obtain the association data indicating the relationship between the each user behavior data and the each target time period.

6. A computer device, comprising:
a memory having computer instructions stored thereon; and
at least one processor; and
wherein the method according to claim 1 is implemented when the processor executes the computer instructions.

7. A non-transitory computer-readable storage medium having computer instructions stored thereon, wherein the method according to claim 1 is implemented when the processor executes the computer instructions.

8. A method of user clustering, comprising according to
acquiring a clustering condition for a predetermined user group, wherein the clustering condition comprises a time selecting condition and an event selecting condition;
determining, based on the time selecting condition, at least one target time period for each user behavior data in a user behavior database;
determining association data indicating a relationship between the each user behavior data and each target time period of the at least one target time period based on the each user behavior data and the each target time period, so as to generate an association table by the association data; and
selecting, from the association table, target association data for a time period to be monitored based on the time period to be monitored and the event selecting condition, so as to determine a target user belonging to the predetermined user group according to the target association data, wherein
the association data contains: the each user behavior data and second time information related to the each target time period;
the each user behavior data contains: user identification information and event description information;
the selecting, from the association table, target association data for a time period to be monitored comprises selecting, from the association table, target association data containing a target time period within the time period to be monitored and the event description information matching the event selecting condition;
the event selecting condition comprises occurrence times of a first predetermined behavior for a first predetermined commodity being greater than or equal to a first predetermined value, and occurrence times of a second predetermined behavior for a second predetermined commodity being greater than or equal to a second predetermined value; and the selecting, from the association table, target association data containing a target time period within the time period to be monitored and the event description information matching the event selecting condition, comprises:
resetting a first counting parameter and a second counting parameter to an initial value of 0, respectively;
searching, in the association table, association data containing the user identification information being equal to a first value and the second time information being equal to a second value;
incrementing a value of the first counting parameter by 1 in response to determining that the event description information of each association data searched indicates the first predetermined behavior for the first predetermined commodity, and incrementing a value of the second counting parameter by 1 in response to determining that the event description information of each association data searched indicates the second predetermined behavior for the second predetermined commodity;
determining whether the value of the first counting parameter is greater than or equal to the first predetermined value or not, and whether the value of the second counting parameter is greater than or equal to the second predetermined value or not when the searching being completed; and
determining the each association data as the target association data, in response to the value of the first counting parameter being greater than or equal to the first predetermined value, and the value of the second counting parameter being greater than or equal to the second predetermined value.

9. The method according to claim 1, wherein the determining a target user belonging to the predetermined user group according to the target association data, comprises:
determining a target user belonging to the predetermined user group for the time period to be monitored according to the user identification information of the target association data.

10. An apparatus of user clustering, comprising:
an acquisition module configured to acquire a clustering condition for a predetermined user group, wherein the clustering condition comprises a time selecting condition and an event selecting condition;
a first determination module configured to determine, based on the time selecting condition, at least one target time period for each user behavior data in a user behavior database;
a second determination module configured to determine association data indicating a relationship between the each user behavior data and each target time period of the at least one target time period based on the each user behavior data and the each target time period, so as to generate an association table by the association data; and
a clustering module configured to select, from the association table, target association data for a time period to be monitored based on the time period to be monitored and the event selecting condition, so as to determine a target user belonging to the predetermined user group according to the target association data, wherein
the association data contains: the each user behavior data and second time information related to the each target time period;
the each user behavior data contains: user identification information and event description information;

the clustering module configured to select, from the association table, target association data containing a target time period within the time period to be monitored and the event description information matching the event selecting condition;

the event selecting condition comprises occurrence times of a predetermined behavior for a predetermined commodity being greater than or equal to a predetermined value; and the clustering module is further configured to:
  reset a counting parameter to an initial value of 0;
  search, in the association table, association data containing the user identification information being equal to a first value and the second time information being equal to a second value;
  increment a value of the counting parameter by 1 in response to determining that the event description information of each association data searched indicates the predetermined behavior for the predetermined commodity;
  determine whether the value of the counting parameter is greater than or equal to the predetermined value or not when the searching being completed; and
  determine the each association data as the target association data in response to the value of the counting parameter being greater than or equal to the predetermined value.

\* \* \* \* \*